US009787881B2

(12) United States Patent
Thursby et al.

(10) Patent No.: US 9,787,881 B2
(45) Date of Patent: Oct. 10, 2017

(54) CAMERA ASSEMBLY (71) Applicant: E.V. OFFSHORE LIMITED, Norfolk (GB)

(72) Inventors: Jonathan Thursby, Norfolk (GB); Shaun Peck, Norfolk (GB); Matthew Gibson-Ford, Norwich (GB)

(73) Assignee: E.V. Offshore Limited (GB)

( * ) Notice: Subject to any disclaimer, the term of this patent is extended or adjusted under 35 U.S.C. 154(b) by 330 days.

(21) Appl. No.: 14/387,167

(22) PCT Filed: Mar. 11, 2013

(86) PCT No.: PCT/GB2013/050590
§ 371 (c)(1),
(2) Date: Sep. 22, 2014

(87) PCT Pub. No.: WO2013/144557
PCT Pub. Date: Oct. 3, 2013

(65) Prior Publication Data
US 2015/0077537 A1    Mar. 19, 2015

(30) Foreign Application Priority Data
Mar. 29, 2012  (GB) .................................. 1205554.7

(51) Int. Cl.
H04N 5/225      (2006.01)
E21B 47/00      (2012.01)
(Continued)

(52) U.S. Cl.
CPC ....... H04N 5/2252 (2013.01); E21B 47/0002 (2013.01); G03B 37/005 (2013.01); H04N 7/183 (2013.01)

(58) Field of Classification Search
CPC ........ H04N 5/225; H04N 7/18; H04N 5/2252; H04N 7/183; E21B 47/00; E21B 47/0002;
(Continued)

(56) References Cited

U.S. PATENT DOCUMENTS 5,402,165 A * 3/1995 Linville ................ E21B 17/028
                                                    348/85
5,485,745 A * 1/1996 Rademaker ........... E21B 17/203
                                                    340/854.7
(Continued)

FOREIGN PATENT DOCUMENTS

EP        0 747 569      12/1996
GB        2491577        12/2012
(Continued)

OTHER PUBLICATIONS

International Search Report and Written Opinion, dated Mar. 21, 2014, PCT/GB2013/050590, dated Mar. 21, 2014. (16 pgs).
(Continued)

Primary Examiner — Dramos I Kalapodas
(74) Attorney, Agent, or Firm — Hayes Soloway PC (57) ABSTRACT A camera assembly (10) for the inspection of passageways, particularly wellbores, and designed to operate in high temperature environments. A camera assembly for the inspection of wellbores comprises an elongate housing (12) having a first end (30) and a second end (42) and, extending between the ends, a side wall comprising an inner wall (22) and an outer wall (24), with a vacuum formed between the inner and outer walls; an elongate relay lens (52) having a first end (56) and a second end (62), the relay lens being located within the housing; an optically transparent window (46) located at the first end of the relay lens; an image sensor (48) located at the second end of the relay lens for capturing an image of an object viewable through the relay lens and
(Continued)

window; and a light source (16) arranged to emit light from the housing, for illuminating the viewable object.

20 Claims, 4 Drawing Sheets (51) Int. Cl.
  *G03B 37/00* (2006.01)
  *H04N 7/18* (2006.01)
(58) Field of Classification Search
  CPC ............... F27D 21/02; F27D 21/0014; F27D 2009/0005; F27D 2021/026; G02B 23/2492; C03B 5/24; G03B 37/005
  See application file for complete search history.

(56) References Cited

U.S. PATENT DOCUMENTS

| | | | | |
|---|---|---|---|---|
| 5,519,543 | A * | 5/1996 | Olsson | E21B 47/0002 348/E5.025 |
| 5,652,617 | A * | 7/1997 | Barbour | E21B 47/0002 348/85 |
| 5,663,758 | A * | 9/1997 | Linville | E21B 47/0002 348/85 |
| 6,115,061 | A * | 9/2000 | Lieberman | E21B 47/0002 175/49 |
| 6,580,449 | B1 * | 6/2003 | Meltzer | E21B 47/0002 348/85 |
| 6,697,102 | B1 * | 2/2004 | Olsson | E21B 47/0002 324/323 |
| 8,020,621 | B2 * | 9/2011 | DiFoggio | E21B 47/011 166/302 |
| 2006/0146172 | A1 * | 7/2006 | Jacobsen | A61B 1/018 348/340 |
| 2007/0002546 | A1 * | 1/2007 | Nomura | G03B 3/04 361/748 |
| 2009/0038391 | A1 * | 2/2009 | Aivalis | E21B 10/62 73/152.43 |
| 2013/0208169 | A1 * | 8/2013 | Hegde | H04M 1/0264 348/335 |

FOREIGN PATENT DOCUMENTS

| | | | |
|---|---|---|---|
| KR | 0201638 | * | 3/2003 |
| WO | 02/06631 | | 1/2002 |
| WO | 03/025488 | | 3/2003 |

OTHER PUBLICATIONS

Search Report under Section 17, dated Jul. 6, 2012, GB 1205554.7 (1 pg).

* cited by examiner

CAMERA ASSEMBLY

BACKGROUND a. Field of the Invention

This invention relates to a camera assembly for the inspection of passageways. In particular this invention relates to a camera assembly for the inspection of wellbores and designed to operate in high temperature environments.

b. Related Art

In oil and gas wells, the wellbore may be open or may be clad with a well casing. Visual inspection of the wellbore is important to check the integrity of the wellbore, and to investigate any downhole problems that may delay or prevent use of the well. For example, it is important to regularly inspect the casings for corrosion and wear.

Although visual inspection of the wellbore is important, the conditions typically found in a wellbore tend to hinder the ability to use many camera systems. Wellbores can have diameters in the range 10 centimeters to 1 meter and can reach depths of hundreds or thousands of meters. In order to inspect these bores, therefore, it is not only necessary to provide a camera system that can operate at these depths, but also to provide the lighting required to be able to capture still images or video in this confined environment.

Furthermore, any camera system must be able to withstand the pressures and temperatures encountered at depth in a borehole. Pressures at these depths can be very large and can reach around 150 MPa, and in addition, temperatures may exceed 100° C.

Typically, downhole camera systems comprise a camera and light source contained in a protective steel sheath. These camera systems are lowered into the wellbore on an electrical cable or a shaft, with the images from the camera being relayed back to the surface where they are displayed and recorded. However, conventional camera systems are not able to withstand the high temperatures for long periods of time, making a thorough visual inspection difficult.

It is known to mount a camera within a vacuum flask housing to protect the image sensor from the high temperatures, however, these systems provide poor image quality.

It is, therefore, an object of the present invention to provide an improved camera system able to operate at high temperatures that overcomes the above problems.

SUMMARY OF THE INVENTION

According to a first aspect of the invention there is provided a camera assembly for the inspection of wellbores, the assembly comprising:
  an elongate housing having a first end and a second end and, extending between the ends, a side wall comprising an inner wall and an outer wall, with a vacuum formed between the inner and outer walls;
  an elongate relay lens having a first end and a second end, the relay lens being located within the housing;
  an optically transparent window located at the first end of the relay lens;
  an image sensor located at the second end of the relay lens for capturing an image of an object viewable through the relay lens and window; and
  a light source arranged to emit light from the housing, for illuminating the viewable object.

Preferably the light source is arranged to emit light from a region of the housing between the window and the image sensor.

Preferably the window is in contact with the first end of the relay lens. In preferred embodiments the assembly further comprises biasing means to maintain a close contact between the window and the relay lens.

Preferably the window is made of sapphire.

Typically the relay lens has a length of between 300 mm and 450 mm, and preferably has a length of between 300 mm and 400 mm.

Preferably the assembly further comprises circuitry for controlling the image sensor and the image sensor is remote from the circuitry. The circuitry preferably includes a Peltier cooler for cooling the image sensor.

Preferably the light source comprises a plurality of light emitting diodes. In some embodiments the plurality of light emitting diodes are spaced around the relay lens proximate the first end of the relay lens. In other embodiments the light emitting diodes are located proximate the second end of the relay lens and the assembly further comprises at least one light pipe to transmit light emitted by the light emitting diodes, within the housing, to a part of the assembly proximate the first end of the relay lens.

In some embodiments the camera assembly provides a forward facing camera such that the window is located at the first end of the housing.

In other embodiments, the camera assembly provides a side view camera so that the window is located in the side wall of the housing. In these embodiments, the assembly preferably further comprises a prism arranged to direct light entering the camera assembly through the window along the relay lens and to the image sensor. The prism will, typically, be located at the first end of the relay lens.

In preferred embodiments the assembly further comprises connecting means at the second end of the housing for connecting the camera assembly to a cable or shaft.

The assembly preferably further comprises an active focus system for maintaining sharp images of an object viewable through the relay lens. This is most beneficial at extremes of temperatures encountered during use of the camera assembly, due to differential thermal expansion of components of the assembly. In a preferred embodiment, the active focus system includes a linear actuator connected to the image sensor or a part of the relay lens.

The invention also provides an inspection tool for the inspection of wellbores, the tool comprising:
  a camera assembly according to the first aspect of the invention;
  a centraliser; and
  a telemetry sub-assembly including means for controlling the camera assembly.

BRIEF DESCRIPTION OF THE DRAWINGS

The invention will now be further described, by way of example only, with reference to the following drawings, in which.

DETAILED DESCRIPTION

Camera systems used to inspect wellbores typically include a camera and one or more light sources arranged to light the field of view of the camera. Typically these are housed in a front, distal end region of an elongate cylindrical housing which is lowered down the wellbore by cables or a shaft attached at a second end. In most cases, the camera systems will also include a viewport or window at or near the front end of the camera housing that serves to protect the camera, in the harsh environmental of a wellbore for example.

Figure 1:
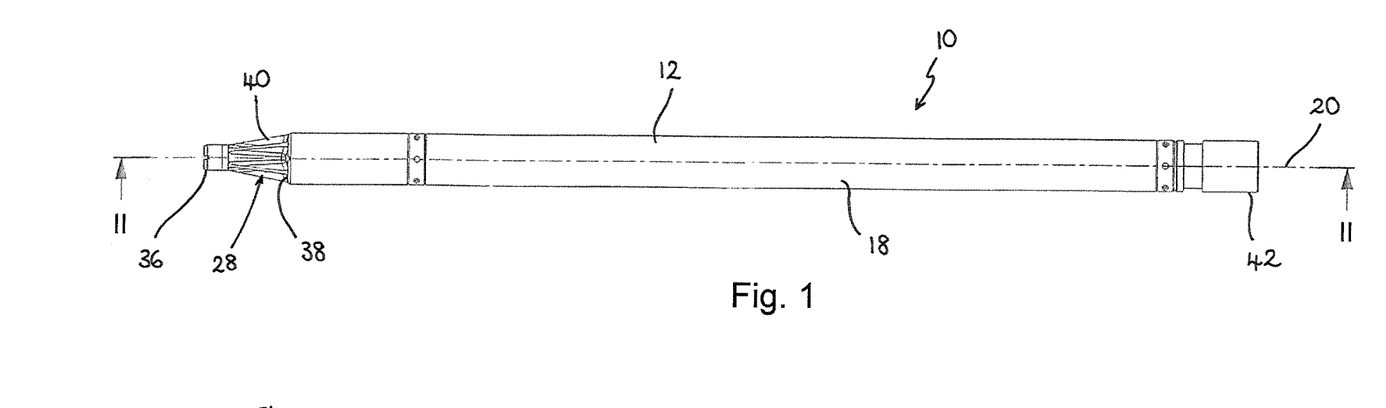
FIG. 1 is a plan view from the side of a camera assembly according to a preferred embodiment of the present invention.
Figure 2:
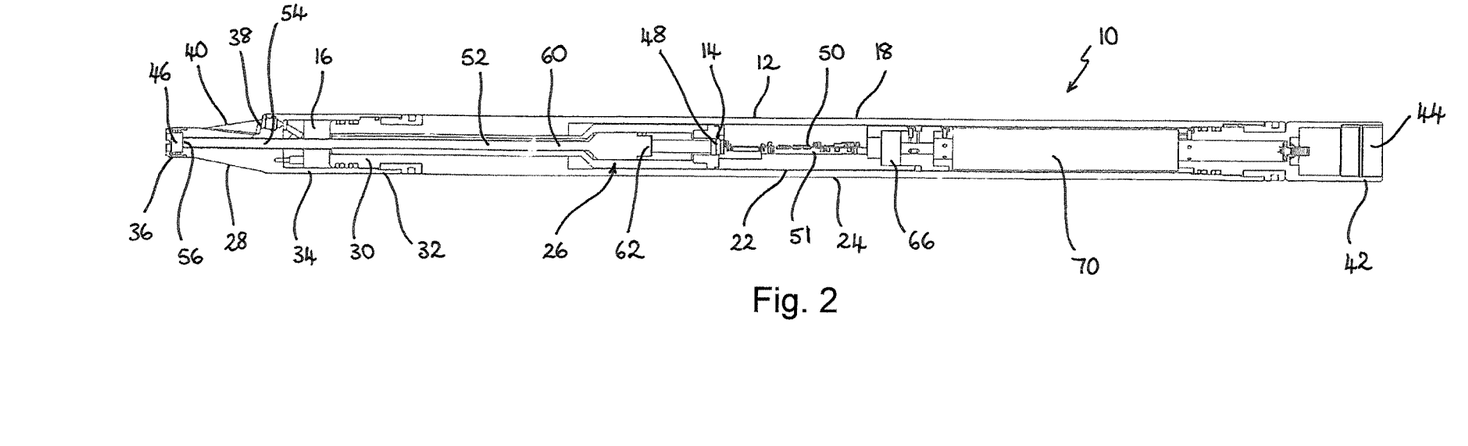
FIG. 2 is a cross-sectional view along the line II-II of FIG. 1.

FIGS. 1 and 2 show an embodiment of a camera assembly 10 according to a first embodiment of the present invention suitable for the inspection of a wellbore or other passageway. The camera assembly 10 includes an elongate tubular main body or housing 12, which is able to withstand the high pressures and temperatures typically encountered in a wellbore. In particular the camera assembly 10 is designed to withstand pressures of up to 150 MPa and temperatures of up to 250° C.

A camera 14 and a light source 16 are located within the housing 12 and are arranged such that, in use, the light source 16 illuminates a portion of the wellbore in front of the camera assembly 10 and the camera 14 captures images of the illuminated area for transmission to a user of the assembly 10.

The housing 12 comprises an elongate and generally cylindrical double walled tube 18, with an outer diameter of between 30 mm and 60 mm, and more preferably between 40 mm and 45 mm. The tube typically has a length of between 850 mm and 900 mm. Most preferably the tube 18 has an outer diameter of 43 mm and a length of 880 mm.

An inner and an outer wall 22, 24 of the tube 18 are spaced apart and a vacuum is formed between the inner and outer walls 22, 24 so that the housing 12 acts as a vacuum flask or Dewer flask, insulating the contents of the housing 12 from the high temperatures exterior to the housing 12 that may be encountered during use.

As shown in FIG. 2, the distance between the inner and outer walls 22, 24 varies along the length of the tube 18. A bore 26 of the housing 12, defined by the inner wall 22, also varies in diameter along the length of the housing 12, and is designed to receive the components of the camera 14 and the light source 16, as well as control means.

A tapered end portion or nose portion 28 is attached to a first distal end 30 of the tube 18. The nose portion 28 includes, at one end 32, a first tubular section 34 sized to fit over the end 30 of the tube 18. As such, an internal diameter of the tubular section 34 is substantially equal to the external diameter of the tube 18 at its first end 30. An opposite, distal end 36 of the nose portion 28 comprises a section having a smaller diameter than the first tubular section 34, such that a shoulder 38 is formed between these two sections having a substantially forward-facing surface. A plurality of substantially triangular webs 40 extends from the shoulder towards the distal end 36 of the nose portion 28 and the webs 40 are spaced evenly around the circumference of the nose portion 28. The tapering of the end portion 28 of the assembly 10 is beneficial to reduce the chances of the end of the camera assembly 10 getting caught on protrusions or restrictions within the wellbore.

A second end 42 of the housing 12, furthest from the nose portion 28, includes connecting means 44 for connecting the camera assembly 10 to a cable or shaft (not shown in FIGS. 1 and 2) for lowering the camera assembly 10 into the wellbore or for connection to other sections of an inspection tool 72, as will be described in more detail below.

Returning to the nose portion 28, an optically transparent window or viewport 46 is located in the distal end 36 of the nose portion 28 of the camera assembly 10, to protect the camera 14 from the harsh environment of the wellbore and seal that end of the assembly 10. Preferably the window 46 is made from a circular disc of sapphire; however, in other embodiments the window 46 may be made of quartz, diamond, crystal or any other suitable material.

An image sensor 48 and associated circuitry 50 are located approximately halfway along the length of the camera assembly 10 within the housing 12. The image sensor 48 preferably comprises a charge-coupled device (CCD) image sensor, but may also comprise a CMOS sensor. The image sensor 48 may be used to capture still or moving images. The image sensor 48 will typically be of a standard resolution, but in some embodiments may be a high resolution (greater than 1280×768), high definition image sensor 48.

The image sensor 48 may be mounted directly on a circuit board 51; however, in a preferred embodiment the image sensor 48 is located remote from the circuit board 51 and a high temperature ribbon cable (not shown), or equivalent, is used to transmit signals between the sensor 48 and the circuitry 50. To maintain the desired operating temperature of the image sensor 48, a Peltier cooler or heat pump (not shown) is preferably located behind the image sensor 48. Additionally in some embodiments the chip of the image sensor 48 may be encapsulated and a vacuum created around the chip. The vacuum further insulates the image sensor chip thereby reducing the likelihood of the image sensor 48 overheating.

The circuitry 50 includes means for storing the data received by the camera 14 (image sensor 48), as well as control means for controlling the operation of the camera 14 and the light source 16.

Located between the image sensor 48 and window 46 is a relay lens 52. A front portion 54 of the relay lens 52 extends into the nose portion 28 of the camera assembly 10 and a first end 56 of the relay lens 52 is positioned against a rear face 58 of the window 46. A rear portion 60 of the relay lens 52 extends along the bore 26 of the housing 12 and a second end 62 of the relay lens 52 is positioned against and in front of the image sensor 48. The elongate relay lens 52, therefore, allows the image sensor 48 to be positioned at a distance from the end 36 of the camera assembly 10 and fully within the housing 12 so that the image sensor 48 and circuitry 50 are not exposed to the high temperatures at the end 36 of the camera assembly 10.

The diameter of the relay lens 52 is preferably maximised to allow as much light as possible to reach the image sensor 48 within the housing 12. However, the diameter of the first end 56 of the relay lens 52 is limited by the diameter of the window 46 at the end of the assembly 10. The diameter of the window 46 is in turn limited by the tapering of the end portion 28 of the assembly 10, as well as the need to withstand the high pressures as mentioned previously. The maximum diameter of the front portion 54 of the relay lens 52 is, therefore, less than the diameter of the window 46. The diameter of the second end 62 of the relay lens 52 within the housing can, however, have a larger diameter than the first end 56 so that the image size captured by the image sensor 48 is maximised.

Generally the relay lens 52 comprises a lens at each of the first and second ends 56, 62. In other embodiments the relay lens 52 may be a long cylindrical gradient-index of refraction lens (GRIN lens). Preferably the relay lens 52 has a length of between 300 mm and 450 mm, and more preferably the lens 52 has a length of 300 mm to 400 mm.

In some embodiments an additional optical element 64 may be placed between the image sensor 48 and the second end 62 of the relay lens 52; however, preferably the image sensor 48 is positioned directly against the end 62 of the relay lens 52.

Due to the high temperatures that may be experienced by the camera assembly 10, the shape and dimensions of the housing 12, and in particular the bore 26 of the housing 12, are such that some movement of the housing 12 around the relay lens 52 and image sensor 48 is possible due to thermal expansion and contraction. In order to prevent separation of the first end 56 of the relay lens 52 from the window 46 and separation of the second end 62 of the relay lens 52 from the image sensor 48 due to this movement, biasing means 66 is located behind the circuitry 50, within the housing 12, to urge the image sensor 48 and relay lens 52 towards the front end 36 of the camera assembly 10. The biasing means 66 typically comprises a resilient member (not shown) that causes the front end 56 of the relay lens 52 to remain tightly pressed against the rear face 58 of the window 46 at all times.

In addition, to compensate for differing thermal expansion of different components within the relay lens 52 optical system, the camera assembly 10 preferably also comprises an active focus system. This is used to maintain sharp images especially at the extremes of the high and low temperatures encountered during use of the camera system 10.

The active focus system comprises means for moving the image sensor 48 and/or one of the optical elements within the relay lens 52, for example the lens at the second end 62 of the relay lens 52. The means for moving these components includes either a motor or, more preferably, a linear actuator capable of operating at high temperatures. In a preferred embodiment the means for moving the optical components is a linear piezoelectric actuator, for example the Squiggle piezoelectric motor of New Scale Technologies, Inc.

The active focus system may be user controlled (open loop) or automatic (closed loop). In the automatic, closed loop systems, control means connected to the motor or actuator comprises algorithms used to detect changes in the image quality and actuate the motor or actuator to move the image sensor 48 and/or optical element within the relay lens 52 to sharpen the resulting image.

The light source 16 of the camera assembly 10 preferably comprises a plurality of light emitting diodes (LEDs) 67 located within the nose portion 28 at the first end 30 of the tube 18. Although other light sources 67 may be used, it is generally preferable to use LEDs 67 because, as well as the extreme pressure and temperature conditions mentioned above, the camera assembly 10 must also be able to withstand significant vibrations during use. These vibrations can cause halogen or filament bulbs to fail, necessitating removal of the assembly 10 from the wellbore and replacement of the bulbs. This is costly both in terms of time and equipment. Additionally, the presence of halogen or filament bulbs, which typically generate significant heat energy, could lead to an explosion if, for example, volatile gases are encountered in the wellbore during use. LEDs are generally more reliable, are vibration proof and generate less heat energy due to their lower power consumption.

The LEDs 67 are spaced apart in a circle around the front portion 54 of the relay lens 52 and set back at a distance from the front end 56 of the relay lens 52. In this example the LEDs 67 are positioned behind the shoulder 38 of the nose portion 28. A plurality of corresponding apertures 68 is formed in the forward-facing surface of the shoulder 38 of the nose portion 28 between each of the ribs 40. In preferred embodiments each of the apertures 68 is sealed by means of a sapphire window 69 or similar optically transparent and pressure resistant cover. Each of the LEDs 67 is aligned with an aperture 68 so that, when the LEDs 67 are illuminated, light is emitted from the camera assembly 10 through the apertures 68 and windows 69. In this way, due to the tapering of the nose portion 28, the LEDs 67 illuminate a region in front of the distal end 36 of the camera assembly 10.

In some embodiments parabolic reflectors are located behind each LED 67. The reflectors reflect and focus the light emitted by the light sources 67 so that more of the emitted light is directed through the apertures 68 to illuminate the wellbore. This allows the size of the light sources 67 to be reduced while retaining the same intensity of illumination per light source 67, and additionally allows a greater number of light sources 67 to be included within the assembly 10, due to their smaller size, thereby increasing the overall intensity of the illumination of the wellbore.

Preferably the LEDs 67 are mounted at an angle within the nose portion 28 so that the light emitted from the camera assembly 10 is directed generally outwards towards the walls of the wellbore in which the assembly 10 is located in use. By mounting the LEDs 67 so that they are not parallel to a longitudinal axis 20 of the camera assembly 10, the majority of the emitted light is initially reflected by the walls of the wellbore before illuminating the area of interest in front of the camera assembly 10 and being reflected back into the lens 52. Preferably the light sources 67 are arranged to illuminate an area at a distance from the front of the camera assembly 10, for example, when imaging a 10 cm diameter passageway, the light sources 67 may be angled to illuminate an area approximately 30 cm in front of the assembly 10. If the light sources 67 were arranged to emit the majority of light in a forwards direction, parallel to the longitudinal axis 20 of the camera assembly 10, the light would reflect directly off particulate matter suspended in the wellbore back into the camera 14. This would cause a 'fogging' effect, reducing the image quality obtainable.

Figure 3:
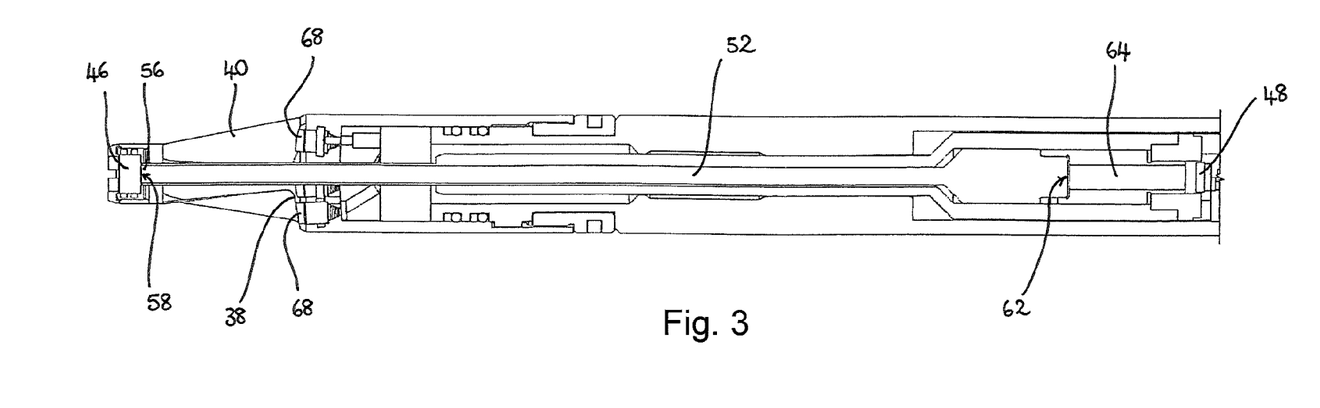
FIG. 3 is a detailed cross-sectional view of a front portion of an alternative embodiment of the camera assembly of FIG. 2.

In an alternative embodiment the light source 16 may be located within the housing 12 proximate the second end 62 of the relay lens 52. In this arrangement a plurality of LEDs are located around the relay lens 52 and a corresponding light pipe or series of light pipes (not shown) extend through the housing 12, substantially parallel to the longitudinal axis 20 of the housing 12. The light pipe(s) transmit the light emitted by the LEDs to the apertures 68 located in the shoulder 38 of the nose portion 28. This has the advantage that the LEDs are also protected from the high temperatures, while still allowing light to be emitted from the assembly 10 near the distal end 36 to light the field of view of the camera 14. In some of these embodiments it may be preferable to include a reflector around a distal end of each of the light pipes, proximate the apertures 68, to focus the light emitted through the apertures 68 in the nose portion 28. As such, the reflectors around the ends of the light pipes would function in a similar way to the reflectors surrounding the LEDs discussed above.

In some embodiments it may be desirable to include one or more holes (not shown) in the ribs 40 to permit a flow of fluid across the front of the light source apertures 68 and windows 69. This is of particular importance when the camera assembly 10 is used to image a generally horizontal passageway where fluid may otherwise become trapped between the ribs 40 causing debris to be deposited on the windows 69 in front of the light sources 67.

To further insulate the camera 14, and in particular the image sensor 48 and circuitry 50, an insulating stopper or bung 70 is positioned within the housing 12, behind the biasing means 66. The stopper 70 comprises a cylindrical container 71 filled with an insulating material. Preferably the container 71 is filled with Teflon shavings, which have good high temperature thermal insulation properties.

Figure 4:
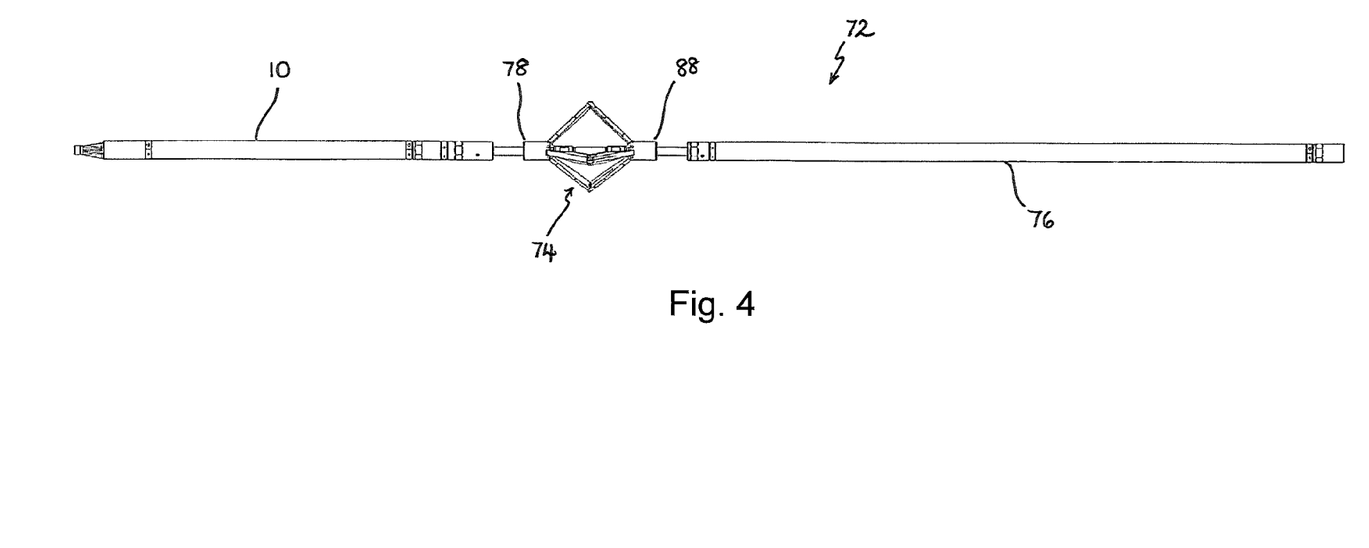
FIG. 4 is a plan view from the side of an inspection tool including the camera assembly of FIG. 1, and further comprising a centraliser and a telemetry sub-assembly.

As shown in FIG. 4 the camera assembly 10 may form part of a larger inspection tool or apparatus 72. In this example, the inspection tool 72 additionally includes a centraliser 74 and a telemetry sub-assembly 76 connected to the second end 42 of the camera assembly 10.

In this arrangement the connecting means 44 of the camera assembly 10 includes mechanical attachment means, to enable the camera assembly 10 to be attached to one end 78 of the centraliser 74, and electrical connection means, to enable an electrical connection to be made between the telemetry sub-assembly 76 and the camera assembly 10.

Figure 5:
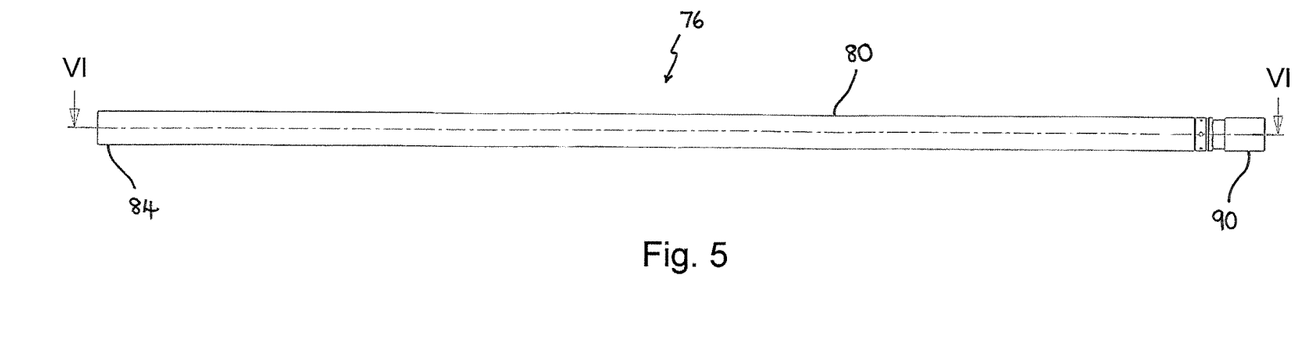
FIG. 5 is a plan view from the side of the telemetry assembly of FIG. 4.
Figure 6:
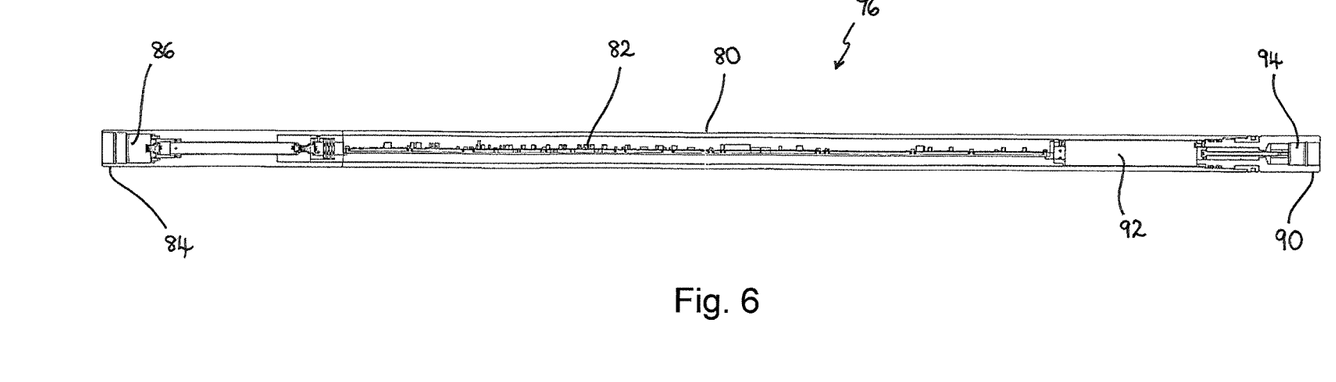
FIG. 6 is a cross-sectional view along the line VI-VI of FIG. 5.

The telemetry sub-assembly 76, as shown in FIGS. 5 and 6, comprises an elongate housing 80 containing circuitry 82 for controlling the operation of the inspection tool 72. The housing 80 preferably comprises a double walled vacuum flask, similar to the housing 12 of the camera assembly 10. The circuitry 82 includes numerous systems for controlling the operation of the camera assembly 10, storing data collected by the camera assembly 10, and transmitting data to a remote user or base station.

A first end 84 of the housing 80 is sealed by connecting means 86 substantially the same as the connecting means 44 in the second end 42 of the camera assembly 10. The connecting means 86 enables the telemetry sub-assembly 76 to be connected to a second end 88 of the centraliser 74 and an electrical connection to be made to the camera assembly 10, as will be explained further below.

A second end 90 of the housing 80 is sealed by an insulating stopper 92, substantially the same as the stopper 70 in the camera assembly 10, and securing means 94 for securing the inspection tool 72 to the end of a cable or shaft (not shown) for deployment down and removal from a wellbore or similar passageway. Typically a single cable is used to support the inspection tool 72 in position down a wellbore, as well as to provide power to the tool 72 and transmit data to and from the tool 72 during use. In preferred embodiments, the power supplied to the inspection tool 72 is constantly monitored so that the correct voltage and current is supplied and no excess power is supplied which would lead to internal heat generation within the tool 72.

The circuitry 82 is held substantially centrally within the housing 80 between the connecting means 86 and the insulating stopper 92 and is preferably mounted on a heat sink 83, which in this example is made of brass. The heat sink 83 draws heat away from the components of the circuitry 82 while mounted within the housing 80 and also provides a single support for the circuitry 82 to enable the circuitry to be removed from the housing 80. When the inspection tool 72 is removed from a wellbore or similar, it is desirable to cool the circuitry components as quickly as possible. While the circuitry 82 is contained within the housing 80, the thermal insulating properties of the housing 80 mean that the circuitry 82 can take a long time to cool, typically of the order of 10 hours. The single supporting heat sink 83 permits the circuitry 82 to be pulled out of the end 90 of the housing 80 to enable faster cooling (typically 1-2 hours).

When the camera assembly 10 and telemetry sub-assembly 76 are connected, in this example via a centraliser 74, to form the complete inspection tool 72, electrical and data connections must be made between the image sensor 48 and light source 16 in the camera assembly 10 and the circuitry 82 of the telemetry sub-assembly 76. In this way, the circuitry 82 can control the operation of the camera 14 and can transmit data from the camera assembly 10 to a remote user or base station whilst the inspection tool 72 is within the wellbore.

The camera assembly 10 and telemetry sub-assembly 76 are both designed so that a number of components, such as the circuitry 82 (mounted on the heat sink 83) and the connecting means 44, 86, are able to be easily removed and replaced. To fulfil this requirement, push fit electrical connectors 96 are located between a number of the components to allow an electrical connection to be made without needing to form a permanent wired connection between them. In particular, push fit electrical connectors are located between the circuitry 82 and the connecting means 86, between the circuitry 82 and the securing means 94, and between the circuitry 50 and the connecting means 44. Preferably the push fit connectors include corresponding keys and keyways, or other similar aligning means, to permit alignment of these connectors during assembly of the tool 72.

In this embodiment the inspection tool 72 further comprises a centraliser 74. The centraliser 74 maintains the position of the tool 72 centrally within a wellbore or passageway during use. The use of a centraliser 74 in an inspection tool 72 is well known and any suitable centraliser 74 may be used in this invention.

Figure 7:
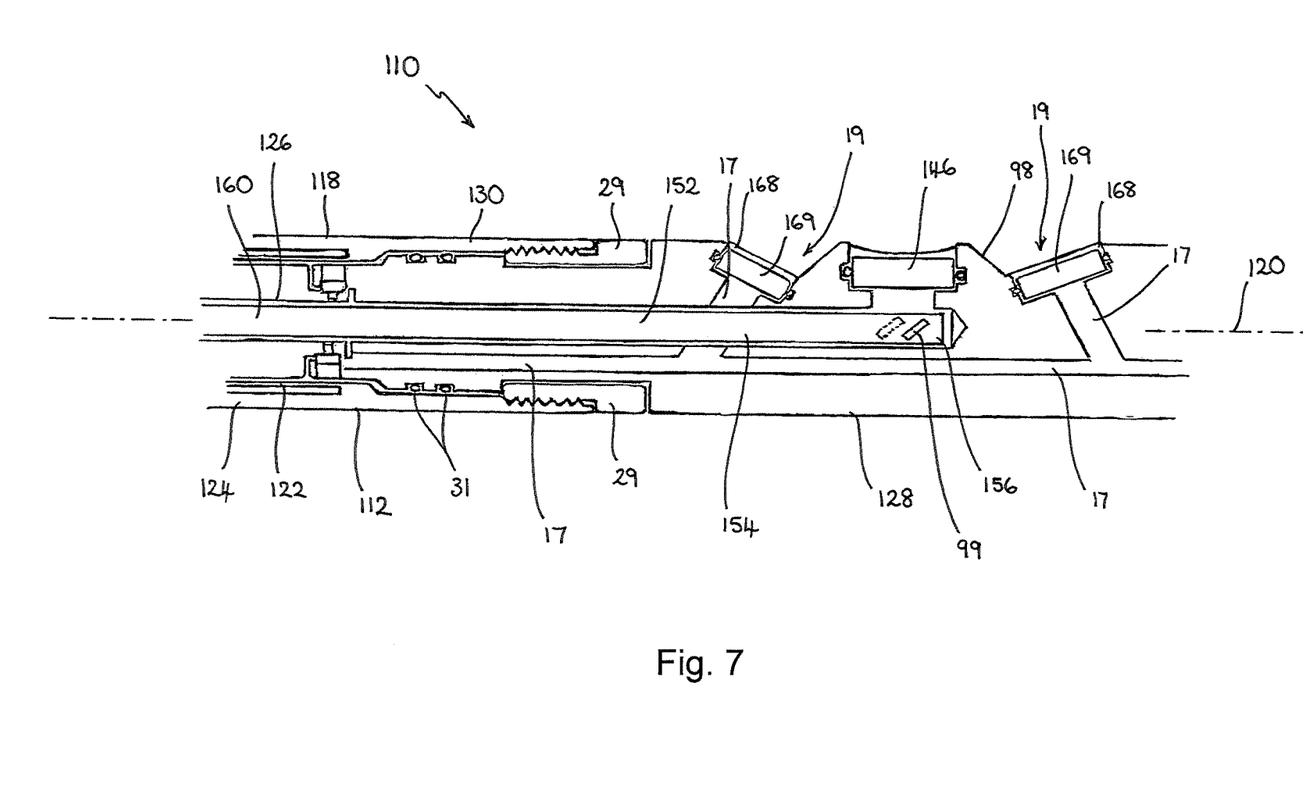
FIG. 7 is a cross-sectional view of a part of a camera assembly according to another preferred embodiment of the present invention.

Another preferred embodiment of a camera assembly 110 according to the present invention is shown in part in FIG. 7. In the previous embodiment, the camera assembly 10 provided a front view camera allowing a region in front of the assembly 10 to be illuminated and imaged. In this embodiment the camera assembly 110 provides a side view camera to enable detailed images of the sides of a passageway, and in particular the walls or casing of a wellbore (not shown), to be captured.

The components of the camera assembly 110 are substantially the same as those of the camera assembly 10 described above and like features will be referenced by numerals incremented by 100.

In this example, the camera assembly 110 includes a housing 112 comprising a cylindrical double walled tube 118. An inner and an outer wall 122, 124 of the tube 118 are spaced apart and a vacuum is formed between the inner and outer walls 122, 124 so that the housing 112 acts as a vacuum flask.

A nose portion 128 is attached to a first distal end 130 of the tube 118. In this example a rear part 27 of the nose portion 128 is received within the first end 130 of the tube 118. Securing means 29 are used to secure the nose portion 128 to the tube 118 and form a tight seal between these sections, together with O-ring seals 31 located between the walls of the nose portion 128 and tube 118. In this example, the securing means 29 is a threaded ring 29 which allows the tube 118 and the nose portion 128 to be attached to each other without requiring rotation of either section with respect to the other.

A front portion 154 of a relay lens 152 extends into the nose portion 128 of the camera assembly 110 and a rear portion 160 of the relay lens 152 extends along a bore 126 of the housing 112, as described above. An image sensor (not shown) is located within the housing 112 at a second end (not shown) of the relay lens 152, thereby allowing the image sensor to be protected from the higher temperatures experienced at the nose portion 128.

An optically transparent window or viewport 146 is located in the nose portion 128 of the camera assembly 110. Preferably the window 146 is made from a circular disc of sapphire; however, in other embodiments the window 146 may be made of quartz, diamond, crystal or any other suitable material. The window 146 is located in a side wall 98 of the nose portion 128 proximate a first end 156 of the relay lens 152.

To direct light entering the camera assembly 110 through the window 146 to the image sensor located at the second end of the relay lens 152, a prism 99 is positioned in the first portion 154 of the relay lens 152 at or near the first end 156. In this way, light passing through the window 146 and entering the first end 156 of the relay lens 152 is deflected through 90° by the prism 99 and is then transmitted along the length of the relay lens 152 to the image sensor. In other embodiments the prism 99 may be replaced by a mirror or other suitable means for deflecting the light into and along the length of the relay lens 152.

A light source is arranged to emit light from the side of the nose portion 128 to illuminate the field of view of the camera, and in particular to illuminate a region in front of the window 146.

The light source of the camera assembly 110 preferably comprises a plurality of light emitting diodes (LEDs) (not shown) located within the housing 112 proximate the second end of the relay lens 152. In this arrangement a plurality of LEDs are located around the relay lens 152 and one or more light pipes 17 extend through the housing 112, substantially parallel to the longitudinal axis 120 of the housing 112 and into the nose portion 128. The light pipes 17 transmit the light emitted by the LEDs to apertures 168 located in the nose portion 128.

The apertures 168 are spaced apart around the window 146 and each of the apertures 168 is sealed by means of a sapphire window 169 or similar optically transparent and pressure resistant cover. In this example, recesses 19 are formed in a circle around the window 146 in the side wall 98 of the nose portion 128 so that the sapphire windows 169 are angled with respect to the axis 120 of the housing 112. In particular a length of the light pipes 17 leading to the apertures 168 and the sapphire windows 169 are arranged such that the light emitted through the windows 169 converges within the field of view of the camera. This provides a maximum intensity of illumination of the sidewall of the passageway in front of the window 146.

In an alternative embodiment, the LEDs are located proximate the first end 156 of the relay lens 152 and the LEDs emit light directly through the sapphire windows 169 without the use of a light pipe.

Through use of a relay lens, the present invention, therefore, allows an image sensor to be protected from the harsh conditions of a wellbore within a vacuum flask whilst the light source and front of the lens are positioned at a distal end of the camera assembly, thereby providing means for capturing high quality images for sustained lengths of time even at high temperatures.

The present invention, therefore, provides an improved camera system able to operate at high temperatures to permit improved inspection of a passageway, and in particular of a wellbore.

The invention claimed is:

1. A camera assembly for the inspection of wellbores, the assembly comprising:
   an elongate housing having a first end and a second end and, extending between said ends, a side wall comprising an inner wall and an outer wall, with a vacuum formed between said inner and outer walls;
   an optically transparent window
   an image sensor for capturing an image of an object viewable through the window;
   a light source arranged to emit light from the housing, for illuminating said viewable object;
   an elongate gradient-index of refraction lens having a first end and a second end and a length of between 300 mm and 450 mm, the gradient-index of refraction lens being located within the housing and the optically transparent window being located at the first end of the gradient-index of refraction lens and the image sensor being located at the second end of the gradient-index of refraction lens; and
   biasing means arranged to urge the image sensor and gradient-index of refraction lens in a direction towards the first end of the housing.

2. A camera assembly as claimed in claim 1, wherein the window is in contact with the first end of the gradient-index of refraction lens.

3. A camera assembly as claimed in claim 1, wherein the gradient-index of refraction lens has a length of between 300 mm and 400 mm.

4. An inspection tool for the inspection of wellbores, the tool comprising:
   a camera assembly comprising an elongate housing having a first end and a second end and, extending between said ends, a side wall comprising an inner wall and an outer wall, with a vacuum formed between said inner and outer walls; an elongate relay lens having a first end and a second end, the relay lens being located within the housing, and the relay lens having a length of between 300 mm and 450 mm; an optically transparent window located at the first end of the relay lens; an image sensor located at the second end of the relay lens for capturing an image of an object viewable through the relay lens and window; and a light source arranged to emit light from the housing, for illuminating said viewable object;
   a centraliser; and
   a telemetry sub-assembly including means for controlling the camera assembly.

5. A camera assembly for the inspection of wellbores, the assembly comprising:
   an elongate housing having a first end and a second end and, extending between said ends, a side wall comprising an inner wall and an outer wall, with a vacuum formed between said inner and outer walls;
   an elongate relay lens having a first end and a second end, the relay lens being located within the housing, and the relay lens having a length of between 300 mm and 450 mm;
   an optically transparent window located at the first end of the relay lens;

an image sensor located at the second end of the relay lens for capturing an image of an object viewable through the relay lens and window; and a light source arranged to emit light from the housing, for illuminating said viewable object.

6. A camera assembly as claimed in claim 5, wherein the light source is arranged to emit light from a region of the housing between the window and the image sensor.

7. A camera assembly as claimed in claim 5, wherein the window is in contact with the first end of the relay lens.

8. A camera assembly as claimed in claim 5, wherein the window comprises sapphire.

9. A camera assembly as claimed in claim 5, wherein the assembly further comprises circuitry for controlling the image sensor and wherein the image sensor is remote from the circuitry.

10. A camera assembly as claimed in claim 9, wherein the circuitry includes a Peltier cooler for cooling the image sensor.

11. A camera assembly as claimed in claim 5, wherein the light source comprises a plurality of light emitting diodes.

12. A camera assembly as claimed in claim 11, wherein the plurality of light emitting diodes are spaced around the relay lens proximate the first end of the relay lens.

13. A camera assembly as claimed in claim 11, wherein the light emitting diodes are located proximate the second end of the relay lens and the assembly further comprises at least one light pipe to transmit light emitted by the light emitting diodes, within the housing, to a part of the assembly proximate the first end of the relay lens.

14. A camera assembly as claimed in claim 5, wherein the window is located at the first end of the housing.

15. A camera assembly as claimed in claim 5, wherein the window is located in the side wall of the housing.

16. A camera assembly as claimed in claim 15, wherein the assembly further comprises a prism arranged to direct light entering the camera assembly through the window along the relay lens and to the image sensor.

17. A camera assembly as claimed in claim 16, wherein the prism is located at the first end of the relay lens.

18. A camera assembly as claimed in claim 5, wherein the assembly further comprises connecting means at the second end of the housing for connecting the camera assembly to a cable or shaft.

19. A camera assembly as claimed in claim 5, wherein the assembly further comprises an active focus system for maintaining sharp images of an object viewable through the relay lens.

20. A camera assembly as claimed in claim 19, wherein the active focus system includes a linear actuator connected to the image sensor or a part of the relay lens.

\* \* \* \* \*